(12) United States Patent  (10) Patent No.: US 7,992,196 B2
Gierach  (45) Date of Patent: Aug. 2, 2011

(54) APPARATUS AND METHOD FOR PERFORMING HOSTED AND SECURE IDENTITY AUTHENTICATION USING BIOMETRIC VOICE VERIFICATION OVER A DIGITAL NETWORK MEDIUM

(75) Inventor: Karl D. Gierach, Irvine, CA (US)

(73) Assignee: Voice Identity, Inc., Irvine, CA (US)

( * ) Notice: Subject to any disclaimer, the term of this patent is extended or adjusted under 35 U.S.C. 154(b) by 914 days.

(21) Appl. No.: 11/982,895

(22) Filed: Nov. 6, 2007

(65) Prior Publication Data

US 2009/0083841 A1   Mar. 26, 2009

Related U.S. Application Data

(60) Provisional application No. 60/857,004, filed on Nov. 6, 2006.

(51) Int. Cl.
*G06F 7/04* (2006.01)
*H04L 29/06* (2006.01)
*H04L 9/32* (2006.01)

(52) U.S. Cl. ............... 726/7; 726/4; 713/168; 704/246; 463/35

(58) Field of Classification Search .................. 726/2–7, 726/26–28; 713/150, 168–170, 182, 186; 704/200, 246, 247, 251, 252, 256, 256.1–256.3, 704/270, 273, 275; 463/1, 29, 30, 35
See application file for complete search history.

(56) References Cited

U.S. PATENT DOCUMENTS

| | | | |
|---|---|---|---|
| 5,687,287 A * | 11/1997 | Gandhi et al. | 704/247 |
| 7,185,197 B2 | 2/2007 | Wrench, Jr. | |
| 2006/0276196 A1 * | 12/2006 | Jiang et al. | 455/446 |
| 2006/0287863 A1 * | 12/2006 | Santos et al. | 704/275 |
| 2007/0022169 A1 * | 1/2007 | Suzuki et al. | 709/206 |
| 2007/0185718 A1 * | 8/2007 | Di Mambro et al. | 704/273 |

* cited by examiner

*Primary Examiner* — Gilberto Barron, Jr.
*Assistant Examiner* — Abdulhakim Nobahar
(74) *Attorney, Agent, or Firm* — Pauley Petersen & Erickson

(57) ABSTRACT

Apparatus, methods, and machine-readable articles of manufacture enable a means of performing vocal tract based authentication and vocal tract based enrollment via the Internet or similar computing network as a communication medium. A protocol and process is outlined which enables Internet or similar network based authentication among three parties; a party wishing to prove a claimed identity, a party requesting to authenticate the claimed identity, and a party performing the authentication or enrollment process. Further, the party requesting authentication is a separate entity from the party performing authentication or enrollment. In such an arrangement, the party performing the authentication or enrollment is termed "hosted" or "software as a service". The protocol and process is suitable for execution by distinct software components installed and running on computers located at the location of each of the three parties.

14 Claims, 4 Drawing Sheets

APPARATUS AND METHOD FOR PERFORMING HOSTED AND SECURE IDENTITY AUTHENTICATION USING BIOMETRIC VOICE VERIFICATION OVER A DIGITAL NETWORK MEDIUM

CROSS-REFERENCE TO RELATED APPLICATION

This application claims the benefit of Provisional U.S. Patent Application, Ser. No. 60/857,004, filed on 6 Nov. 2006. The co-pending Provisional Patent Application is hereby incorporated by reference herein in its entirety and is made a part hereof, including but not limited to those portions which specifically appear hereinafter.

BACKGROUND OF THE INVENTION

1. Field of the Invention

The present invention relates generally to computing, biometrics, cryptography and digital networking. More particularly, the invention relates to the use of a digital network as a medium for performing vocal-based biometric identification on behalf of another party requesting identity verification, utilizing cryptographic techniques to protect information as it is transferred over the digital network.

2. Discussion of Related Art

With the explosion of the Internet in recent years, more and more companies are hosting web sites that allow a client to log into their accounts via those websites by typing a password entered at a computer terminal. Many of these accounts are banking and financial based. Since a text password can easily be compromised, in order to prevent theft and fraud, alternate means of identification are needed. In general, biometric verification is a useful means of proving claimed identity. However, it can be argued that certain types of biometrics, such as retinal scans and thumbprint scans are only useful if the person to be verified is physically present at the location of the challenging party or entity requesting authentication. Vocal tract based biometric verification is however distinctly different from the static measurement of say a retinal scan or thumbprint scan, in that it is a dynamically produced measurement, whereby the information used to verify identity can be distinctly different each time a proof of identity is required. For example, the challenging party formulates a new random challenge phrase each time authentication is needed. This challenge phrase must then be recited or spoken to the challenging party in exact order by an individual desiring to prove their identity.

Vocal tract based biometric verification generally includes two phases; an enrollment phase and a verification phase. During enrollment, a speech processor running on a computer is used to segment spoken phrases in audio form into feature vectors. Next, these feature vectors are fed into a data classification engine, which produces a unique voiceprint, or model of an individual's voice. During the verification phase, an enrolled individual's voiceprint is loaded into the data classification engine. The individual who desires to be verified is prompted to speak one or more randomly chosen phrases via a Text-to-Speech (TTS) component. These phrases are digitally captured by a microphone attached to a computer, and are first identified for correctness, by providing them as input to an Automatic Speech Recognizer (ASR). The ASR determines if the phrase spoken matches the challenge phrase in terms of human understandability. For example if the challenge phrase is "one two three four", and the individual speaks "four three two one", this first test fails. Secondly, the phrases are again fed as input through a speech processor which produces feature vectors. These feature vectors are then fed as input into the data classification engine, which compares the data model produced to the previous voiceprint. Based on certain criteria specific to the verification algorithm, the identity verification is either accepted or rejected.

SUMMARY OF THE INVENTION

A general object of the invention is to provide an apparatus, method and article of manufacture for performing a vocal-based biometric authentication or enrollment process over the internet in a hosted fashion or a Service Oriented Architecture (SOA) model.

Another object of the present invention is to perform the authentication or enrollment process in such a fashion as to be cryptographically secure, given the fact the Internet is an open, public network. Due to the present popularity of mobile Internet use, a need also exists to perform the authentication or enrollment process without restricting the end user, who is an individual desiring to be vocally authenticated or enrolled, to a static or fixed location on the Internet at time of verification.

Embodiments of the present invention are directed to methods, apparatus, and articles of manufacture that satisfy one or more of these needs. In some embodiments, the invention herein disclosed is a method of performing vocal-tract based authentication via a packet switched network, such as Transmission Control Protocol/Internet Protocol (TCP/IP) based networks, wherein a communication protocol is used among three parties at hand; a user operating a terminal, an institution, and a verification service. Each party is preferably located at a distinct location with respect to Internet addresses.

According to this method, the user operating the terminal, where the terminal possibly includes a computer equipped with a web browser, soundcard (or similar on-board device capable of digital-to-analog audio conversion, and analog-to-digital audio conversion), speaker, microphone, and/or other software capable of communicating via the communication protocol establishes a first connection to software executing at the institution. This first connection can be a Hyper Text Transfer Protocol (HTTP) or similar network connection. At some time later, the user claims a particular identity, which is transmitted by the first connection to the institution. This first connection may be secured by a secured socket layer (SSL) protocol or similar, with at least the institution providing proof of identity. Proof of identity may be accomplished with, for example, a X509 certificate.

The institution then initiates the next step of the protocol process by establishing a second connection to software executing at the verification service. The second connection may be secured by an SSL protocol or similar. Further certificates, such as X509 certificates, may be utilized to provide proof of identity on the institution end and the verification service end of the connection. Within the second connection, a session is established for vocal enrollment and/or vocal authentication.

For vocal authentication, the institution provides a first identifier, for the institution, and a second identifier, for the user operating the terminal, to the verification service. In return the verification service sends a session identifier to the institution, along with a first binary string, a secret key, representing pending success of the authentication process. A file is then generated within an Extensible Markup Language (XML) or similar format by the institution, which is subsequently transmitted to the terminal via the first connection.

This file contains specific information regarding the session identifier previously established, as well as an address that the software of the terminal may use to interact with the verification service. When the XML file is transmitted to the terminal from the institution, it is associated with a new Multipurpose Internet Mail Extension (MIME) specific for the purpose of vocal authentication. The web browser of the terminal is preconfigured to launch a previously installed software component on the computer of the terminal, when an object of this MIME type is received. As the next stage of the protocol, this previously installed software component establishes a third connection to the verification service. The third connection transmits a Simple Object Access Protocol (SOAP) or a HTTP request or similar to start the authentication process and may be encrypted via SSL with X509 or similar method. For this third connection, only the verification service preferably provides an X509 certificate. The third connection preferably provides a control layer, an audio transmission layer from the verification service and an audio transmission layer from the terminal. In an alternative embodiment this third connection between the terminal and the verification service may comprise a plurality of separate connections for each of the layers or combinations of the layers. The control layer relays the state of the authentication system. In this embodiment, the authentication system state is determined by the verification service.

The vocal-based biometric authentication further includes a cycle of challenge and response exchanges. To begin, a challenge, for example, a random prompt, is sent in human comprehensible audio form from the verification service to the computer of the terminal via the audio transmission layer from the verification service and is rendered via the soundcard and speakers installed in the computer of the terminal. In response to the challenge, the user responds vocally to the challenge and is recorded via a microphone attached to the computer of the terminal. This recording, a voice print, is transmitted, preferably in encrypted form, to the verification service via the audio transmission layer from the terminal. The cycle of challenge and response may repeat one or more times if the vocal data analyzed by the verification service does not initially match both the challenge phrase and a pre-existing voiceprint associated with the identity claimed by the user operating the terminal. When the challenge and response cycle has ended, a second binary string is transmitted via the third connection, the control layer, from the verification service to the previously installed software component on the computer of the terminal. Next, the previously installed software component on the computer of the terminal completes the protocol by relaying the second binary string to the institution via the first connection. The software service running on the institution determines the authentication result by comparing the first binary string to the second binary string. If the first binary string and the second binary string are identical, then the user operating the terminal is successfully authenticated. If the first binary string and the second binary string are not identical then the authentication fails.

In an alternate embodiment the previously described procedure can also be applied to vocal enrollment, which is a prerequisite to vocal authentication. Yet, in further alternate embodiments, other forms of biometric based authentication, apart from vocal tract based biometric authentication and including retinal scans and fingerprint identification, may be substituted or incorporated into the apparatus and method provided by this invention. Alternate embodiments may use other apparatus apart from a web browser to initiate the authentication process.

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

The invention herein disclosed can be implemented in an open digital network of heterogeneous computers, such as the Internet. The invention is inherently designed to provide a biometric voice verification on behalf of a first party wishing to be authenticated, a second party wishing to authenticate and a third party providing authentication services. The framework of the invention provides for multiple parties to interact simultaneously. Each party is preferably, though not necessarily, located at a separate location on the network. The first party wishing to authenticate optionally may be located on a separate network, partitioned behind a firewall. The firewall is a computing device residing on two or more networks, which permits computing devices located on a separate, generally smaller network, access to a greater network. At each location, a computing device is present which executes code instructions comprising the process and articles of manufacture of the invention. A code may be loaded into the memory of the computing device from a machine-readable medium, such as a CD, a DVD, a flash memory, a floppy or a hard drive, or a similar memory or storage device.

Reference will now be made in detail to several embodiments of the invention that are illustrated in the accompanying drawings. The drawings are in simplified form, not to scale, and omit apparatus elements and method steps that can be added to the described systems and methods, while including certain optional elements and steps.

Figure 1:
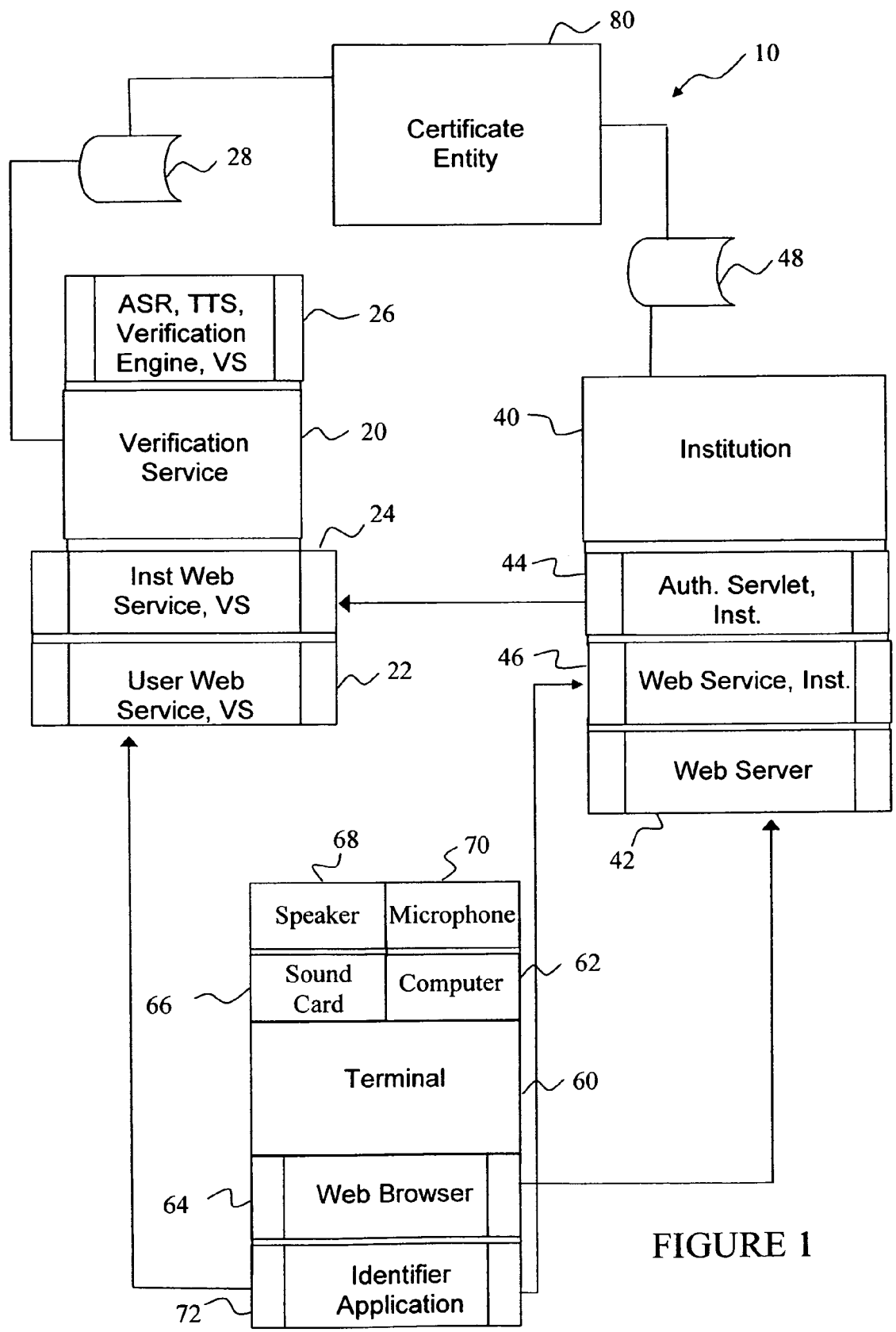
FIG. 1 is a block diagram of the entities involved in a "hosted" service based speaker authentication framework in accordance with an embodiment of the present invention.

FIG. 1 illustrates a block diagram 10 of entities involved in a "hosted" service based speaker authentication framework in accordance with an embodiment of the present invention. The hosted service based speaker authentication framework includes three primary entities: a verification service 20; an institution 40; and a terminal 60. The verification service 20 includes a user verification web service 22, an institution verification web service 24 and an ASR/TTS/verification subsystem 26. According to a preferred embodiment of the invention, the institution 40 includes a web server 42, an authentication servlet 44 and an institution web service 46. The authentication servlet 44 is preferably written in java, however, the authentication servlet 44 may be written in any language. The terminal 60 preferably includes a computer 62, a web browser 64, a soundcard 66, a speaker 68, a microphone 70 and an identifier application 72. A certificate entity 80 is a software service, pertinent to the present embodiment making use of Secure Socket Layer (SSL) which provides authentication between software services running on the institution 40 and the verification service 20. All connections between the three primary entities—the verification service 20, the institution 40 and the terminal 60—are preferably TCP/IP based connections and bi-directional. A digitally signed certificate of the verification service 28 is present to validate authentication of the user verification web service 22 and the institution verification web service 24 running on the verification service 20. Also, a digitally signed certificate of the institution 48 is present to validate authentication of the web server 42, the authentication servlet 44 and the institution web service 46 running on the institution 40 respectively.

Figure 2:
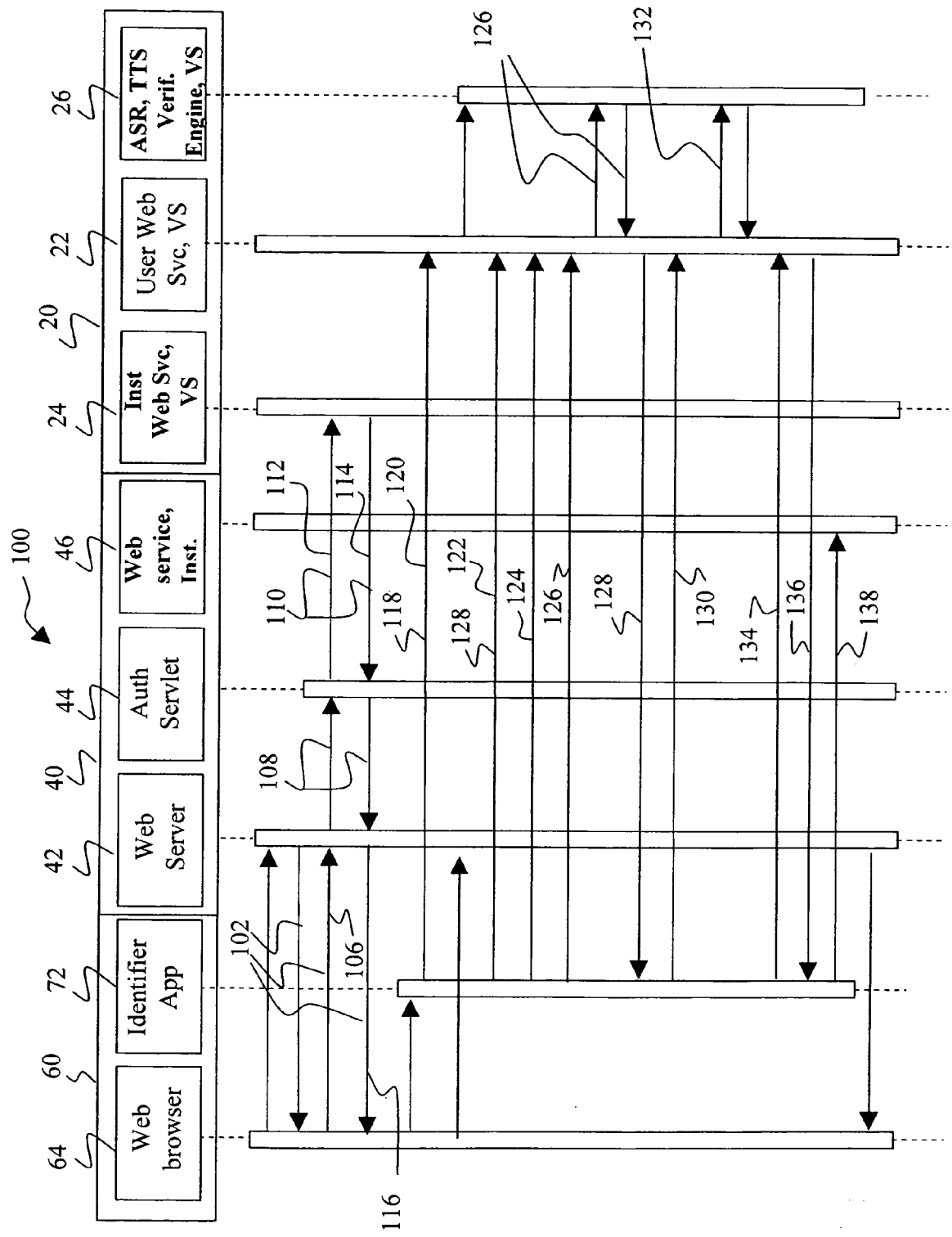
FIG. 2 is a process flow diagram illustrating selected steps of a process for performing speaker verification on behalf of an institution and a user utilizing the services of the institution.

Referring to FIG. 2, a sequence diagram 100, the interactions of the entities shown in FIG. 1 are illustrated, for the purpose of displaying a process for vocal enrollment or vocal authentication according to one preferred embodiment of the invention. It should be noted that the connections and messages in all three figures are similar, and all three figures apply to both enrollment and authentication interactions. FIG. 2 shows connections and messages sent between the various entities within the scope of a particular embodiment of the invention.

As shown in FIG. 2, a first connection 102 is established between the web browser 64 and the web server 42, which is encrypted via SSL and the authentication of the web server 42 is validated via the digitally signed certificate of the institution 48. The digitally signed certificate of the institution 48 is provided from the web server 42 to the web browser 64 via the first connection 102 to ensure authentication of the institution 40 to the terminal 60. A first message 104 is transmitted via the first connection 102, from the terminal 60 to the institution 40, which claims an identity.

Typically, a user operating the terminal 60 claims the identity via a method of identification such as a user-name and a password, to establish a session. The state of the session is preferably managed by the code running within the web server 42 and the authentication servlet 44. When the user operating the terminal 60 decides to request execution of a transaction, it sends a transaction message 106 from the web browser 64 to the web server 42, within the context of the session. In sequence, the web server 42 communicates to the authentication servlet 44, a software component running within the institution 40 computer(s) which provides backend logic for serving dynamic web pages. A pre-existing connection 108 is assumed between the web server 42 and the authentication servlet 44, alternatively, both the web server 42 and the authentication servlet 44 may exist within the same binary executable image, executing at the institution 40.

The authentication servlet 44 next establishes a second connection 110, from the authentication servlet 44 to the institution verification web service 24. The second connection 110 is preferably secured via SSL with client and server side certificates, the digitally signed certificate of the verification service 28 and the digitally signed certificate of the institution 48. Via the second connection 110, a second message 112 is sent from the authentication servlet 44 to the institution verification web service 24 to request establishment of a session between the institution 40 and the verification service 20 for vocal enrollment into the system, or to validate the claimed identity. One purpose of the second message 112 depends on the purpose of the transaction message 106, namely vocal enrollment or vocal authentication, but may include a secret key, a large binary string that will provide authentication of the user operating the terminal 60.

In order to establish the session between the institution 40 and the verification service 20, the institution 40 provides the second message 112 from the authentication servlet 44 to the institution verification web service 24 wherein, preferably, at least two pieces of information are specified: an account ID for the institution 40 and a user ID for the user operating the terminal 60 to be authenticated or enrolled. If credentials match, the session between the institution 40 and the verification service 20 is created within the context of the verification service 20, and a third message 114 containing pertinent information is transmitted via the second connection 110. A fourth message 116 is then transmitted via the web server 42 and the first connection 102 to the web browser 64, which in turn launches the identifier application 72. The fourth message 116 may take the form of a particular Multipurpose Internet Mail Extension (MIME) type, which can be pre-registered with the web browser 64 to trigger launch of the identifier application 72. The fourth message 116 preferably contains data, which is fed into the identifier application after its launch. Among the items in the data of fourth message 116 are the location of the verification service 20 and a session identifier created for authenticating the particular user. Next, the web browser 64 waits for a current web page to change by polling for refreshes, or alternatively, by using other common web technologies, such as AJAX/JavaScript, to provide notification when the authentication session is complete.

Again referring to FIG. 2, the identifier application 72 establishes a third connection 118 to user verification web service 22. This third connection 118 is secured via SSL and the digitally signed certificate of the verification service 28. The identifier application 72 sends a fifth message 120 to the user verification web service 22 to begin the vocal authentication process. The fifth message 120 preferably contains at least the session identifier, which is temporarily valid, and establishes the start of the vocal authentication procedure. The identifier application 72 then establishes a fourth connection 122 and a fifth connection 124, which are of a different type, and set up a recording audio path through the fourth connection 122 and a playing audio path through the fifth connection 124. Each connection 122, 124 is encrypted, via SSL or similar. The third message 114, provided from the verification service 20, presents the session identifier to the institution 40. And, the fifth message 120, provided from the institution 40, presents the session identifier to the verification service 20. A cycle is then entered, where, in one preferred embodiment:

1) The verification service 20 generates an audio-based prompt 126 via the ASR/TTS/verification subsystem 26. The audio-based prompt 126 is then transmitted within a sixth message 128 to the identifier application 72 via the fourth connection 122 in encrypted form. The identifier application 72 then renders this audio to the user of the terminal 60 via the soundcard 66 and the speaker 68.

2) The user repeats the prompt 126 into the microphone 70 and the identifier application 72 records. Generating audio data which is sent within a seventh message 130 to the verification service 20 via the fifth connection 124.

3) The verification service 20 sends the audio data to the ASR/TTS/verification subsystem 26 for analysis via an eighth message 132. The ASR/TTS/verification subsystem 26 converts the audio data into a voice print. Then:

a) If the present mode of operation is authentication, the analysis is focused on matching the voiceprint to a pre-existing voiceprint of the user within a predetermined confidence quantity.

b) Alternatively, if the present mode of operation is enrollment, producing the pre-existing voiceprint, or training, the analysis is focused on ensuring that the audio data contains the correct human speech, again within the predetermined confidence quantity, that was prompted in cycle step 1 for the user to speak in step 2.

4) If the analysis in step 3 satisfies the predetermined confidence quality constraints mentioned in step 3, then the cycle ends. Otherwise step 1 is resumed. If the cycle repeats a predetermined or actively determined maximum quantity of times, then the cycle ends. For example, in certain embodiments the maximum times the cycle may repeat is three. However, in another embodiment, the maximum times the cycle may repeat is five. Yet, in another embodiment the cycle count may be determined based on confidence values observed in step 3 of the cycle. A ninth message 134 queries the verification service 20 to determine if the cycle is due to repeat.

Referring to FIG. 2, a tenth message 136 is sent from the verification service 20 to the identifier application 72. This tenth message 136 contains a large binary string, which denotes either failure or success of the authentication. The tenth message 136 is sent via the encrypted third connection 118. Next, the identifier application 72 establishes a sixth connection 138 to the institution web service 46, again encrypted via SSL or similar. Authentication of the institution 40 to the identifier application 72, is performed in the SSL layer, utilizing certificate digitally signed certificate of the institution 48. Via the sixth connection 138, the identifier app sends an eleventh message 140 to the institution web service 46. The eleventh message 140, at a minimum, preferably contains the resultant large binary string and the session ID for this particular authentication or voice print training session. At this point in the process, the role of the web service 46 is to update internal data of the institution 40, regarding whether or not the authentication or voiceprint training session succeeded, and secondly to cause a web page on the computer 62 to refresh for the user of terminal 60. At this point in time, the institution 40 now has the result of the authentication session, and can allow/disallow the original user-requested transaction to proceed.

Figure 3:
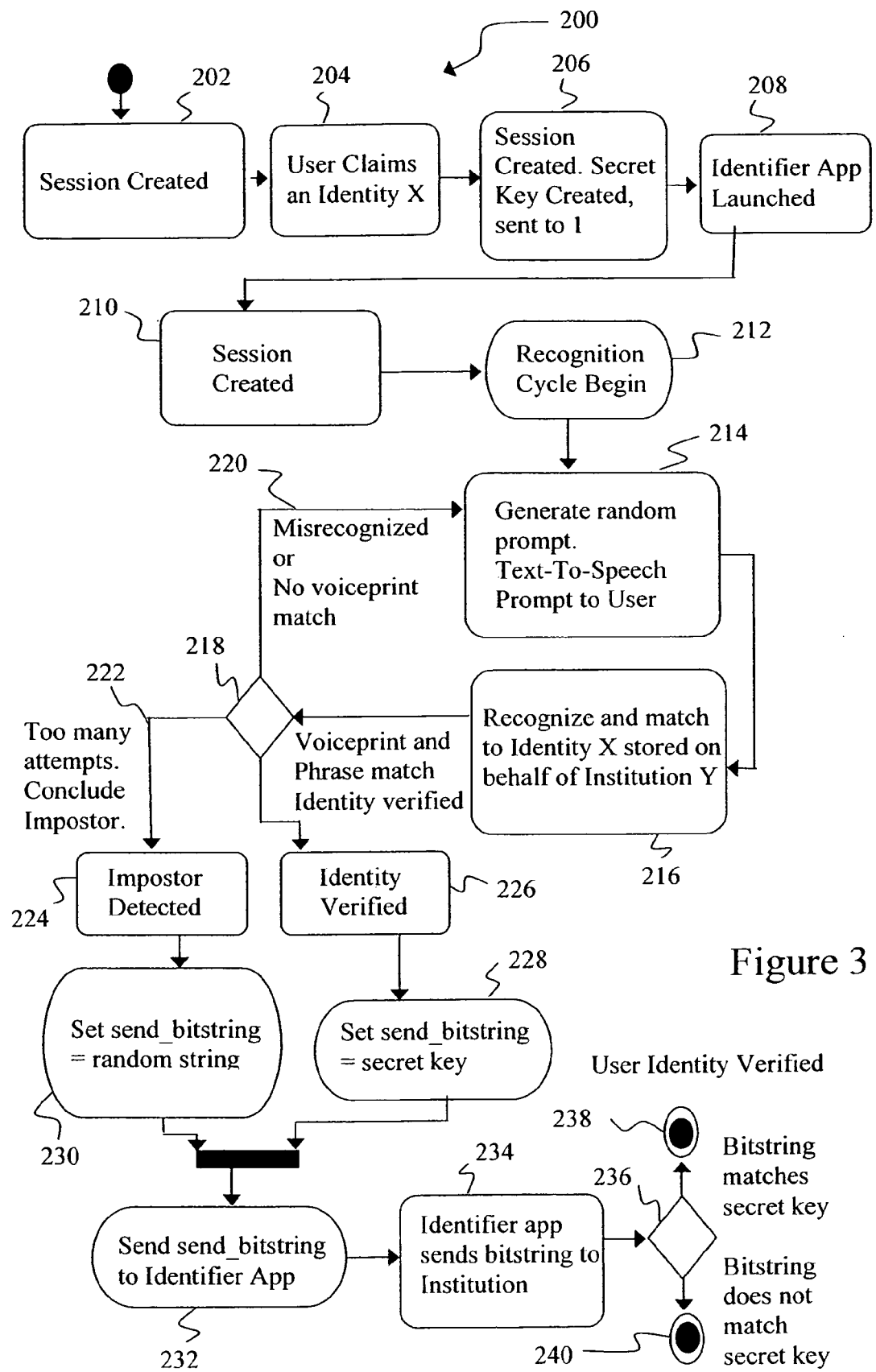
FIG. 3 is a diagram illustrating selected steps of a process for performing speaker verification on behalf of the institution and the user utilizing the services of the institution.

Referring to FIG. 3, a diagram 200 of the interactions of the entities are shown from the viewpoint of state changes, as the various components change state throughout the operation of a preferred process. In FIG. 3, the mode of operation presented is authentication, which assumes that the user has established the pre-existing voiceprint via the verification service 20.

Referring to FIG. 3, in step one 202, the user first establishes the session between the terminal 60 and the web server 42, and claims the identity in step two 204. In step three 206, the session is then created between the institution 40 and the verification service 20 and the secret key is created by the verification service 20 and sent to the institution 40. In step four 208, the identifier application 72 is launched. Then, in step five 210, the session between the terminal 60 and the verification service 20 is created. In step six 212, the recognition cycle begins. After prompting by the verification service 20, step seven 214, the voiceprint of the user is provided to the verification service in step eight 216, the verification service 20 uses speech recognition and speech verification engines to compare the voiceprint of the user with the pre-existing voiceprint to determine if the user of terminal 60 matches their claimed identity, decision 218. If the voiceprint provided by the user of terminal 60 is either misrecognized or does not match the pre-existing voiceprint, then the recognition cycle, step seven 214 and step eight 216, may be repeated, arrow 220. A non-arbitrarily chosen limit may be placed on the number of times the recognition cycle may repeat, arrow 222 and the verification service 20 determines an imposter, step nine(a) 224. If the user's speech was correctly spoken and the voiceprint matched the existing voiceprint, step nine(b) 226, then a valid binary string is selected, step ten(b) 228, and is presented to the identifier application 72, step eleven 232. Otherwise, if the user's voiceprint did not match the pre-existing voiceprint, then an invalid binary string is selected, step ten(a) 230, and provided to the identifier application 72, step eleven 232. The identifier application 72 has no, way of determining whether or not the binary string is valid or not, since the valid binary string, denoting successful authentication, is a shared secret between the verification service 20 and the institution 40. The identifier application 72 then presents the binary string it received from the verification service to the institution 40, step twelve 234. The institution 40 in turn, compares the binary string to the shared secret key, decision 236. If the two binary strings match, then the user of terminal 60 has successfully authenticated, result 238. Otherwise, if the binary string presented by the identifier application 72 does not match the shared secret key, the user of terminal 60 has not successfully authenticated, circle 240.

Figure 4:
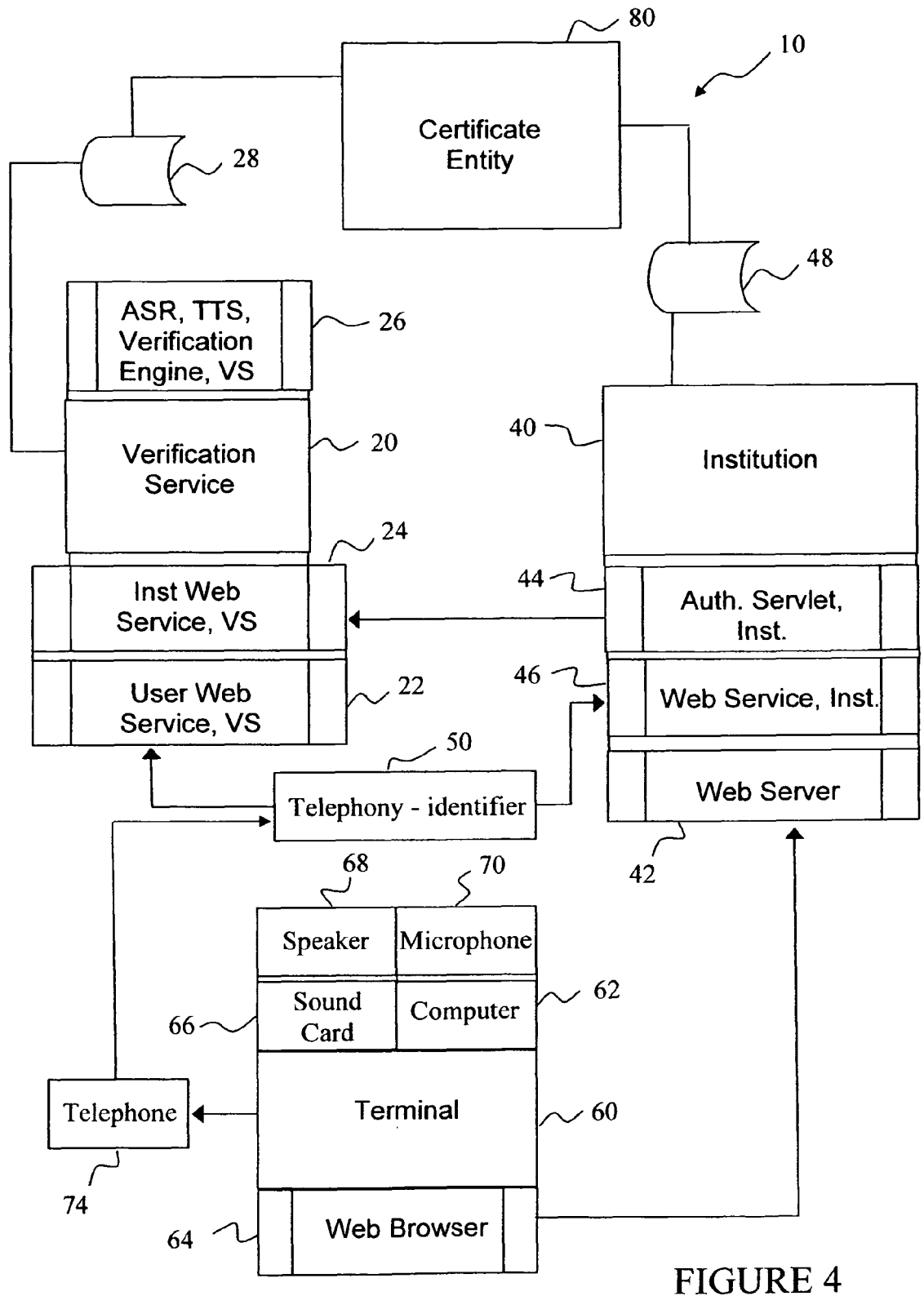
FIG. 4 is a block diagram of the entities involved in a "hosted" service based speaker authentication framework in accordance with an alternative embodiment of the present invention.

According to one preferred embodiment of this invention, as shown in FIG. 4, the identifier application 72 is replaced by a telephony-identifier 50 and a telephone 74. The telephony-identifier 50 is preferably hosted by the institution 40, though not necessarily physically located at the institution 40. As such, the telephony-identifier 50 need only have network access to the institution 40. For the user to perform the vocal authentication or vocal enrollment in this alternative embodiment, the user connects to the telephony-identifier 50 through the telephone 74. The telephony-identifier 50 then establishes an encrypted connection with the user verification web service 22.

The embodiments described are useful for performing vocal based speaker authentication over the Internet; however the protocol and method of the present invention may be used for performing authentication of other forms including retinal scans and fingerprint identification. By substituting an addition to or a replacement of the ASR/TTS/verification subsystem 26 with another type of authentication engine, and by replacing or adding to the speaker 68 with another medium of instruction or challenge and by replacing or adding to the microphone 70 for capturing input other forms of authentication may use the presented process for performing authentication.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for performing secured identity authentication of a user of a terminal using biometric voice verification comprising:

establishing a first connection between the terminal and an institution; establishing a second connection between the institution and a verification service, wherein the verification service maintains a pre-existing voiceprint of the user;

generating a secret key and a session identifier in the verification service;

sending the secret key session identifier to the institution via the second connection;

establishing a third connection between the verification service and the terminal;

generating a random voice prompt by the verification service and sending the random voice prompt to the user via the third connection;

repeating the random voice prompt by the user, generating an audio data and supplying the audio data to the verification service via the third connection;

converting the audio data to a voiceprint via the verification service; and determining via the verification service one of a match between the voiceprint and the pre-existing voiceprint and a non-match between the voiceprint and the pre-existing voiceprint;

generating a binary string in the verification service, wherein the binary string matches the secret key if the verification service determines the match between the voiceprint and the pre-existing voiceprint and wherein the binary string does not match the secret key if the verification service determines the non-match between the voiceprint and the pre-existing voiceprint;

sending the secret key from the verification service to the institution;

sending the binary string from the verification service to the terminal;

sending the binary string from the terminal to the institution; and authenticating an identity of the user by comparing the binary string to the secret key at the institution.

2. The method of claim 1 wherein at least one of the first connection, the second connection and the third connection is encrypted and authenticated via a certificate and a certificate authority.

3. The method of claim 1 wherein the third connection includes a plurality of connections.

4. The method of claim 1 wherein the terminal includes a web browser and an identifier application.

5. The method of claim 4, wherein the institution includes a web server, an authentication servlet and an institution web service.

6. The method of claim 5, wherein the verification service includes a user verification web service, an institution verification web service and an automatic speech recognizer (ASR)/text-to-speech recognizer (TTS)/verification subsystem.

7. The method of claim 1, wherein the step of establishing the first connection further includes:

claiming an identity via an user-name and a password; and
requesting a session.

8. The method of claim 1, wherein the step of establishing the first connection further includes:
claiming an identity via a finger print scan; and
requesting a session.

9. The method of claim 1, wherein the step of establishing the first connection further includes:
claiming an identity via a retinal scan; and
requesting a session.

10. The method of claim 1, wherein the step of establishing the second connection further includes:
providing an account ID for the institution;
providing a user ID for the user to be authenticated; and
establishing a session.

11. An apparatus for performing secured identity authentication of a user operating a terminal using biometric voice verification comprising:

an institution in communication with the terminal;

a verification service in communication with the institution and the terminal, the verification service maintains a pre-existing voiceprint of the user;

a secret key generated supplied by the verification service and provided to the institution;

a random voice prompt supplied by the verification service to the user;

an audio data supplied by the user to the verification service, wherein the verification service converts the audio data to a voiceprint and determines one of a match and a non-match between the voiceprint and the pre-existing voiceprint, wherein if the verification service determines the match between the voiceprint and the pre-existing voiceprint, the verification service generates and sends a valid binary string to the terminal which equals the secret key and wherein if the verification service determines the non-match between the voiceprint and the pre-existing voiceprint, the verification service generates and sends a non-valid binary string to the terminal which does not equal the secret key wherein the terminal sends the valid binary string to the institution, and wherein the institution compares the valid binary string to the secret key to authenticate the user.

12. The apparatus of claim 11 wherein the terminal includes a web browser and an identifier application.

13. The apparatus of claim 12 wherein the institution includes a web server, an authentication servlet and an institution web service.

14. The apparatus of claim 13, wherein the verification service includes a user verification web service, an institution verification web service and an automatic speech recognizer (ASR)/text-to-speech recognizer (TTS)/verification subsystem.

* * * * *